United States Patent [19]

Blasch et al.

[11] 4,428,895

[45] Jan. 31, 1984

[54] COMPOSITE INORGANIC STRUCTURES AND PROCESS OF PRODUCING SAME

[75] Inventors: Earl Blasch, Albany, N.Y.; Robert Smith-Johannsen, Incline Village, Nev.

[73] Assignee: Blasch Precision Ceramics, Inc., Schenectady, N.Y.

[21] Appl. No.: 423,736

[22] Filed: Sep. 27, 1982

Related U.S. Application Data

[63] Continuation of Ser. No. 260,732, May 5, 1981, which is a continuation of Ser. No. 17,154, Mar. 2, 1979, abandoned.

[51] Int. Cl.$^3$ ............................................. C04B 35/02
[52] U.S. Cl. ........................................ 264/28; 264/60; 264/86
[58] Field of Search ............................. 264/28, 60, 86

[56] References Cited

U.S. PATENT DOCUMENTS

| | | | |
|---|---|---|---|
| 3,177,161 | 4/1965 | Johannsen | 264/28 |
| 3,512,571 | 5/1970 | Phelps | 264/28 |
| 3,634,179 | 1/1972 | Anderson | 264/60 |
| 3,812,229 | 5/1974 | Anderson | 264/60 |
| 3,816,572 | 6/1974 | Roelofs | 264/28 |
| 3,885,005 | 5/1975 | Downing | 264/28 |
| 4,246,209 | 1/1981 | Johannsen | 264/28 |
| 4,341,725 | 7/1982 | Weaver | 264/28 |

*Primary Examiner*—John P. Parrish
*Attorney, Agent, or Firm*—Pennie & Edmonds

[57] ABSTRACT

Composite inorganic articles are produced by bringing two separate inorganic slurries, each containing different ceramic materials, into contact with each other, simultaneously freezing the slurries while in contact with each other to form a unified frozen structure, thawing and drying the structure, and firing the unified structure.

16 Claims, No Drawings

COMPOSITE INORGANIC STRUCTURES AND PROCESS OF PRODUCING SAME

This is a continuation of application Ser. No. 260,732 filed May 5, 1981, pending which is a continuation of Ser. No. 017,154 filed Mar. 2, 1979, now abandoned.

TECHNICAL FIELD

This invention relates to composite inorganic structures, such as composite ceramics, composed of different inorganic materials which are laminated or adhered together. The composite structures are characterized by the presence of an extremely strong interfacial bond between the layers which permits the composites to withstand extremely high temperatures as well as thermal shock. The invention also relates to a process for producing the composite structures disclosed herein.

BACKGROUND OF THE INVENTION

Composite inorganic structures such as ceramics, can be considered as being in the nature of laminates where at least one inorganic structure, such as a zirconia plate, is adhered to another, such as an alumina plate. Such composite ceramics would be of considerable value in the refractory industry if an adequate bond could be obtained between the different ceramics sufficient to withstand the high temperatures and thermal shock to which they are frequently subjected particularly in the metal and glass industries. Prior attempts to produce such composite ceramics by simultaneous firing of the ceramics in a single mold or by firing the ceramics separately and cementing them together have not been successful to applicants' knowledge. The interfacial bonds between the different ceramics obtained in these manners have not been adequate to withstand the high temperatures and thermal shock to which they are frequently subjected. This interfacial bond failure is caused by a number of factors but is mainly due to the differences in the thermal coefficients of expansion of the different refractories or ceramics. A further problem involved in producing composite ceramics is the difference in the firing temperatures required of the different ceramic materials.

Freezing a slurry of ceramic material to form ceramic structures has been disclosed in the U.S. Pat. Nos. 3,177,161; 3,512,571; 3,816,572 and 3,885,005. None of these patents, however, disclose or suggest the formation of composite ceramic articles of different ceramic materials.

SUMMARY OF THE INVENTION

This invention relates to composite inorganic articles, particularly ceramics, composed of different inorganic materials adhered or laminated together and having an interfacial bond of extraordinary strength sufficient to withstand extremely high temperatures and thermal shock experienced in the metals industry. Composite ceramics produced according to this invention have been subjected to temperatures as high as 6000° F. without any noticeable effect on the interfacial bonds.

This invention also includes a process for producing composite ceramics in a single mold by inserting the different ceramic materials into the mold in layered fashion and in contact with each other, freezing the layered ceramics while in contact with each other, thawing the frozen composite, and then firing the thawed composite.

There are a number of important and surprising results obtained when composite ceramic articles are made according to this invention. The bond between the two different ceramics is at least as strong as the bond between the particles of the individual ceramics employed. The composite frozen structure can be fired at a single temperature despite the fact the ceramics individually are known to require different firing temperatures. The differences in the thermal coefficients or the mass thermal coefficients of expansion of the different ceramics does not cause disruption or weakening of the interfacial freeze bonding during the firing operation and the fired bond is not affected during high temperature use or by subjecting the composite ceramic to extreme thermal shock. It is further surprising that experiments to date indicate that a very wide range of different ceramics can be employed to make the composite ceramics of this invention having wide differences in their firing temperatures and thermal coefficients of expansion.

The thermal coefficient of expansion refers to the expansion of the individual particles or crystals of the refractory. When these particles are bonded or sintered together in a mass and heat is applied, it is the individual particles that expand causing the dimensions of the entire mass to change due to the cumulative effect of the expansion of the individual particles. This phenomenon is referred to herein as the mass thermal coefficient of expansion.

When refractories are prepared by the conventional process, they act as a single body and when the body is subjected to heat the entire body expands due to the cumulative effect of the individual particles or crystals making up the body. In the composites of this invention, the body acts as individual particles and although the individual particles or crystals expand when the body is heated during firing, the body itself does not change dimensions to any significant extent. Other advantages of the invention are described herein during detailed discussion of the process and composite structures.

The inorganic products produced according to this invention are porous and the size of the grains or particles employed in the slurries will to a large extent determine the degree of porosity. The products of the invention have a wide variety of uses depending to some extent on the type of particle being employed in the process. For example, if ceramic particles are employed, the products can be used in the same manner as ceramic and refractories are used such as fire brick, linings for furnaces in the steel, glass and other industries. They can also be used as filters, carriers for catalysts, thermal shock resistant dinnerware, grinding wheels, etc. When particles such as graphite and molydisulfide are employed their uses can include many of the above but adding thereto the lubrication properties of these materials. Generally the products are useful in any area where porosity is desired or in areas where porosity is not desired but is not detrimental.

DETAILED DESCRIPTION AND PREFERRED EMBODIMENTS

Various inorganic materials can be used according to this invention including, without limitation, aluminas such as mullite and tabular alumina, silicas such as fused silica, magnesia, chromite, spinels such as chromite spinel, kyanite, carbomul, zirconia, mica, graphite, uranium oxide, thoria, titania, and clays. Mixtures may be used if desired. Although every conceivable combination has not been tried to date, there appears to be no apparent reason why the various combinations cannot be produced according to this invention.

Although many different inorganic materials can be used to form composites, some of the more commercially important composites are ceramic or refractual composites such as zirconia-alumina, zircon-alumina, magnesia-alumina, silica-alumina, zircon-silica, zirconiamagnesia and zircon-magnesia composites. The zirconia-alumina composite, for example, is particularly valuable to the steel industry. Zirconia has a low thermal conductivity when compared to alumina, and is very corrosive and errosive resistant to molten steel. Zirconia, however, is not very strong when compared to alumina (especially in its soft form) and is also much more expensive than alumina. Thus, a zirconia-alumina composite brick or slab having about one-quarter inch of zirconia adhered to one side of two to three inches of alumina gives a product of high strength and at a significantly reduced cost while retaining all of the advantages of zirconia in its most desirable soft form. The advantages of other combinations of ceramics will depend somewhat upon their intended use and variations can be produced to meet the requirements of any particular end use as discussed herein and as will be apparent to those skilled in the art. Alumina is presently preferred as a basic ceramic to which other ceramics are bonded because it is inexpensive, strong, easy to work with, and has a convenient firing temperature.

The particle size of the ceramics is advantageously as small and uniform as practical. Best results seem to have been obtained to date when the majority of the particles, or 40–50% of them, are below about 200 mesh. Small particles or grain size seems to be particularly advantageous when using zirconia.

The ceramics can be formed into various composite structures as will be apparent to those skilled in the art. For example, alumina can be faced on one or more sides with zirconia or magnesia, the internal surface of alumina cylinders can be lined with zirconia, alumina nozzles and laddles can be lined with zirconia and so forth.

The freeze-sensitive colloidal ceramic sols useful according to this invention are well known and include colloidal silica sols, such as disclosed in the Smith-Johannsen U.S. Pat. No. 3,177,161 and U.S. Pat. Nos. 3,512,571 to Phelps, 3,816,572 to Roelofs and 3,885,005 to Downing et al. A freeze-sensitive sol is one which, when frozen, will break down and no longer exist as a sol or colloidal suspension when thawed. Both cationic and anionic silica sols can be used with the anionic preferred at least with alumina and zirconia. Ammonia stabilized silica sols, such as Dupont's AM LUDOX, may be advantageous where elimination of sodium is desired. Other freeze-sensitive colloidal ceramic sols, such as zirconia and magnesia sols, can also be used. Silica sols have been used because they are readily available on the market. Although not necessarily preferable due to insufficient experimental data to date, present experiments are mainly utilizing a freeze-sensitive sodium stabilized colloidal silica sol having about 30% colloidal silica supplied by Nalco Chemical Company due to its availability.

The total amount of sol stabilizer such as sodium, ammonium and/or lithium should be sufficient to stabilize the sol but not be so high as to render the sol non-freeze sensitive or to lower the strength of the fired silica or other ceramic contained in the sol when fused or fired or to lower the strength of the fused or fired product to an unacceptable level. This can readily be determined by routine experimentation by one skilled in the art. For example a mole ratio of silica to lithia of about 85 in a lithium stabilized silica sol works quite well but when the ratio is lowered to about 48 the sol appears to lose some freeze sensitivity resulting in weaker bonds. The optimum amounts have not as yet been determined.

Generally, the sodium stabilized silica sol are quite adequate to practice the invention disclosed herein. With some inorganic particles, namely zirconia and magnesia, some adjustments can be made to improve the results. These adjustments are desirable to improve pot life and to preserve the distribution of particle sizes during the filling operation so that an optimum degree of uniform packing can be obtained.

When zirconia, for example is mixed with a negatively charged sodium stabilized silica sol (Du Pont Ludox HS-40) it is well wetted and the particles quickly segregate. It is believed that this segregation occurs because the sol particles and the zirconia particles are so charged to prevent or minimize particle association. The zirconia particles generally have a charge of about $-20$ m.v. (zeta potential) in deionized water while the above Ludox particles are even more highly charged. To overcome the particle segregation problem, the zeta potential of the particles comprising the various mixes can be altered.

One way of altering the zeta potential is to reduce the pH of the above Ludox from about 10 to about 8 by adding dilute HCl which lowers the zeta potential of the silica sol particles rendering them less stable. Under these conditions, the silica particles begin to precipitate onto the ceramic (zirconia) particles creating a degree of association between all of the particles of the mix and segregation of coarse and fine ceramic particles such as zirconia is greatly inhibited. The acid can also be added to the inorganic particles or to a mixture of the sol and particles. The amount of acid is that which is sufficient to prevent settling or segregation of the particles. In practice, it is advantageous to add the acid directly to the sol. With zirconia, the amount of acid found practical to accomplish the result is about 0.6 percent by weight (based on to total weight of zirconia) of a 37 percent HCl solution. If such a problem is encountered with other inorganic particles the zeta potential can be measured and an appropriate adjustment with acid or alkali can be made to alter the zeta potential in such a manner as to insure suitable particle association.

Zirconia, and especially magnesia, also appear to react with the sodium stabilizer (and also ammonia somewhat) to cause limited pot life). In fact, the reaction with magnesia is so rapid that mixing itself becomes difficult. The use of a lithium stabilized silica sol was found to eliminate this reaction to the extent that a magnesia dispersion could be readily mixed and cast without concern of short pot life. The use of lithium stabilized sols also overcomes the particle segregation problem referred to above with respect to zirconia. Thus it may not be necessary to adjust the zeta potentials of the particles if a sol having the requisite zeta potential can initially be used.

When the lithium stabilized silica sol was used with magnesia and zirconia another new and very signigicant property was observed. These sols inhibited ice crystal growth even in the absence of supercooling. In fact, when nucleation was deliberately initiated, in the case of magnesia dispersion containing lithium ions, from the surface with an ice crystal, no macro or large crystal growth was detectable for more than two millimeters from the initiation site. Thus the use of lithium stabilized ceramic sols not only solved the pot life problems and particle segregation problems of zirconia and magnesia, but has been found extremely advantageous for producing small uniform ice crystals during the freezing step with regard to all inorganic dispersions. The use of a lithium stablized ceramic sol in combination with supercooling has been found most advantageous.

When using lithium in the inorganic particle slurries containing a freeze sensitive ceramic sol, it is of course most practicable to employ a lithium stabilized ceramic sol available on the market. A silica sol having a silica to lithia ratio of 85 worked quite well, however, this sol, DuPont's Lithium Polysilicate 85, is not being marketed today. One lithium stabilized silica sol which is available today contains a silica to lithia ratio of about 48 (Du-Pont's Lithium Polysilicate 48). This amount of lithia however minimizes the freeze sensitivity of the sol and when used alone produced fired products having weaker bonds. This commercial lithium stabilized sol can be used however by using it in admixture with a sodium or preferably an ammonia stabilized sol. A 50—50 mixture has worked well but the optimum has not as yet been determined. It is the presence of the lithium which produces the surprising ice crystal growth inhibition rather than the absence of sodium or ammonia. Thus lithium ions can be added to the slurries by the addition of ionizable lithium compounds such as lithium chloride, lithium hydroxide, lithium sulfate, lithium succinate and so forth. It is preferred to add the lithium ions to the ceramic sol. The amount of lithium ions added to an inorganic particle slurry should be sufficient to inhibit ice crystal growth to the desired degree but insufficient to adversely affect the freeze sensitivity of the sol. This can be determined by routine experimentation with respect to any particular system being frozen. Only a very small amount of lithium ion is necessary to inhibit ice crystal growth. Higher amounts may be required to increase the pot life when magnesia is used, such as used in Example 7.

Various freezing media can be used to freeze the slurry structures such as those described in the abovementioned patents. The use of a hydrophobic freezing media, such as freon or perchloroethylene is particularly important. This prevents penetration of the freezing media into the aqueous slurries and inhibits the growth of large or variable sized ice crystals, and aids in accomplishing supercooling.

The freezing of the slurries should advantageously be done in such a way that the ice crystals that form are very large in number and consequently very small. As a dispersion is cooled to the freezing point, nucleation almost always occurs at one of the cooling surfaces due to chance contact with an ice crystal or contact with a mold surface that has a nucleation temperature higher than that of the slurry itself. When this happens, large ice crystals grow out from these points and eventually entrap the last remaining liquid, with the consequence that some disruption and distortion generally occurs. The large ice crystals also leave weakening voids in the structure.

Supercooling of the slurry to a temperature where it spontaneously nucleates results in a structure that is uniform throughout. At the time of nucleation not all the water freezes because the heat of fusion raises the temperature back to the freezing point. However, as cooling proceeds further, ice crystal growth is completed from all of these nucleation sites. The structure that develops is therefore much more uniform and fine grained regardless of the thickness of the structure to be produced or frozen.

To accomplish the supercooling and substantial instantaneous freezing, it is not a simple matter of inserting a mold filled with the slurries into a cold freezing media even at $-40°$ or $-60°$ F. The most advantageous way of insuring supercooling of the ceramic slurries is to wet, preferably by dipping, the mold with a hydrophobic liquid such as xylene, mineral spirits, or perchloroethylene to cover the entire surface of the mold, inserting the slurries into the mold while it is still wet and covering the top of the ceramic slurry with a layer of the hydrophobic liquid. The mold can then be closed and the slurry frozen. It is also advantageous to cover the aqueous suspensions in the mold with a thin layer of the hydrophibic liquid and to use the same hydrophobic liquid as the freezing media such as perchloroethylene. The mold itself is preferably of light weight and of low mass relative to the freezing media and the ceramic being frozen. The mold and freezing media should also have a high thermal conductivity. Although the freezing temperature can be varied, it should be sufficiently low to insure supercooling and a rapid freeze. Temperature of about $-45°$ to $-50°$ F. can be used and when lithium is used the freezing temperature can advantageously be about $-10°$ F.

Random tests made on some of the freezing steps set forth herein indicate that the temperature of supercooling is about 4 degrees below the freezing temperatures of the aqueous slurry.

When producing large articles, supercooling may only occur to a certain depth from the cold surface toward the center of the slurry because all of the heat within the center cannot be removed before freezing of a portion of the slurry closer to the mold. When large articles are to be made, it is thus advantageous to cool the entire slurry to near the freezing point before inserting it into the freezing media to insure complete supercooling. The presence of lithium ions in large slurries is also advantageous.

The various inorganic materials useful according to this invention have different and known firing temperatures in conventional processes. For example, alumina is generally fired at a temperature of 1400° C. or slightly above, and zirconia at about 1700° C., in conventional refractory processes. As a general rule, freeze-cast ceramics are most advantageously fired at about 50% to 65% of their melting temperature. Thus, when firing freeze-cast ceramics, alumina is advantageously fired at about 1250° C. while zirconia is advantageously fired at about 1400° C. Other inorganic materials can be fired at their known firing or fusion temperatures or at about 50% to 60% of their melting temperatures In firing the composite ceramics, it has been found to be advantageous to fire at a temperature for the ceramic having the lower firing temperature. For example, when firing a composite composed of alumina and zirconia, it has been found advantageous to fire it at about 1250° C. Such a firing temperature, however, is below that normally used for zirconia and also below that which is used for firing the individually freeze-cast zirconias, namely 1400° C. When firing such a composite at 1250° C., the zirconia would normally be considered as somewhat underfired. Soft zirconia is even more corrosive and errosive resistant to molten uranium than hard zirconia fired at its normal temperature; and the fact that the zirconia is bound or adhered to the alumina renders the composite as a whole very strong, thus permitting one to take maximum advantage of the properties of zirconia while maintaining excellent strength. If desired, the zirconia portion of such a substance could be locally fired to increase its hardness.

Other inorganic structures can be sintered at their own known or determined sintering temperatures. The temperature used and time of heating should be sufficient to bond the particles together into a strong integral structure but insufficient to significantly reduce or adversely affect the desired porosity or uniformity of the product. Examples of such temperatures are given, for example, in U.S. Pat. No. 3,177,161.

The molds or patterns are usually made of lightweight steel or aluminum if more thermal conductivity is desired. In order to facilitate removal of the frozen body from the mold, the molds may be lubricated with known mold release agents, such as wax, silicone, graphite, etc. The treating of a mold with a hydrophobic liquid to aid in supercooling can also act as a release agent, and this is therefore preferred.

The ceramic slurries should be as free from entrapped air as practical. Entrapped air can be avoided to some extent in the manner by which the ceramic slurries are first mixed, and any entrapped air can be removed in various known manners, such as using long periods of holding time, vibration, or vacuum treatment techniques.

After freezing, the frozen ceramic slurry composites are removed from the mold, thawed and dried. Although various manners of thawing and drying can be employed, the thawing and drying can be accelerated by the use of heat. The use of a conventional drying oven has been found satisfactory for this purpose.

After selection of the specific ceramic materials to be formed into a composite structure, they can be mixed in the conventional manner having due regard to particle size, and the freeze-sensitive colloidal ceramic added to each of the dried ceramic materials selected. The freeze-sensitive coloidal ceramics are contained in water and the solid colloidal content may range from 15% to 50% solids. Thus, the addition of the freeze-sensitive colloids to the dried ceramic material usually automatically adds the necessary water for handling. For example, a mix commonly used in slip casting containing up to about 10% water, having a consistency somewhat like pancake batter can be poured into a mold or injected by simple means. The consistency of the ceramic slurries or mixtures are such that when they are placed in contact with each other or layered within the same mold, they do not intermix to any significant extent. This can readily be accomplished by maintaining the proper consistency of the ceramic slurries either by using high solid content freeze-sensitive colloidal ceramic sol or by removing water from the slurries prior to bringing them into contact with each other. One manner of accomplishing this mixing is to dry mix the ceramic grain in a ribbon blender and add the freeze-sensitive ceramic sol together with its liquid component, slowing the ribbon blender and continuing until thorough mixing is obtained. The particulate suspensions or slurries, should have particle content sufficient to insure particle to particle contact during the freezing step as described in U.S. Pat. No. 3,177,161. If the particles are dispersed too thinly, no structure will be formed when the ice melts. The amount of water is desirably held to a minimum practical amount for economic reasons. The mixtures are then placed in the appropriate mold in contact with each other, the top of the mold is then covered, and the entire mold inserted into the freezer. The frozen composite is then removed from the mold, dried in a drying oven, and then fired in the kiln.

The formation of the composite structures can take place in a single mold. The different ceramics are formed into slurries containing the freeze-sensitive colloidal ceramic sols. One ceramic slurry can then be placed at the bottom of the mold and the different ceramic slurry placed on top thereof, the composite frozen, thawed, and subsequently fired. To prevent any substantial mixing of the different ceramics, the slurries can be formed in a viscous state or other techniques can be used to prevent significant mixing, such as inserting a thin separating slip or shield between the ceramic slurries and pouring the other slurry on top or on the other side of the slip to temporarily effect a physical separation of the different slurries and then removing the separating slip just prior to the freezing of the slurries.

The amount of the freeze-sensitive ceramic sol can be as reported in the above-noted U.S. patents. The most suitable percentage appears to be about 15% by weight of the colloidal ceramic sol (35% solids) based on the weight of the dried ceramic.

EXAMPLE 1

| LAMINATE ZIRCONIA-ALUMINA (11" melting crucible) | |
|---|---|
| Alumina Mix (15 kilograms) | |
| Tabular Alumina Alcoa T 61 | |
| 28 + 48  Mesh | 55% |
| 100       " | 25% |
| 325       " | 20% |
| Sol 30% solids Colloidal Silica (NALCO) pH about 10 | 14.3% by weight |
| Zirconia Mix (7 kilograms) | |
| Monoclinic Zirconia | |
| 100       " | 50% |
| 325       " | 50% |
| Sol 30% solids Colloidal Silica (NALCO) Modified by 0.6% HCL. to pH 7.5 | 12.4% by weight |

EXAMPLE 2

| LAMINATED ZIRCON-ALUMINA (plate) | |
|---|---|
| Alumina Mix (1060 grams) | |
| Tabular Alumina Alcoa T61 | |
| 28 + 48  Mesh | 55% |
| 100       " | 25% |
| 325       " | 20% |
| Sol 30% solids Colloidal Silica (NALCO) pH about 10 | 14.3% by weight |
| Zircon (600 grams) | |
| 80 Mesh | 70% |
| 325 Mesh | 30% |
| Sol 30% solids Silica (NALCO), pH about 10 | 11.7% by weight |

EXAMPLE 3

| LAMINATED ALUMINA & MULLITE (plate) | |
|---|---|
| Tabular Alumina Alcoa T61 (300 grams) | |
| 14 Mesh | 40% |
| 48 Mesh | 44% |
| 325 Mesh | 16% |

-continued

| LAMINATED ALUMINA & MULLITE (plate) | |
|---|---|
| Sol 30% Silica (NALCO), pH about 10 | 14.7% by weight |
| Mullite-Remasil #60 (89 grams) | |
| 20 Mesh | 30% |
| 70 Mesh | 30% |
| 200 Mesh | 30% |
| 325 Mesh | 10% |
| Sol 30% Silica (NALCO), pH about 10 | 14.6% by weight |

The above mixes were thoroughly blended and each mix had the consistency of thick pancake batter and could be poured and placed in a mold with the aid of a spatula. The molds were thoroughly waxed and highly polished. The zirconia mix was first placed in each mold to the desired depth, about ¼ inch in these examples, and the alumina, zircon, and mullite in each of the above examples placed in the same molds on top of the zirconia to a depth of about two inches. The top layers of alumina, zircon and mullite are each then covered with a layer of hydrophobic freezing liquid, the molds closed and molds inserted entirely in perchloroethylene freezing liquid at a temperature of −48° F.

The frozen composite bodies were then removed from the mold while frozen, thawed and dried in a radiant heated oven at a temperature of about 120° F. After drying the composite bodies were each fired in a conventional kiln at a temperature of 1250° C. for about 4 hours, after which the moldings were allowed to slowly cool to ambient temperature. The moldings were then subjected to heat and thermal shock by applications of a 3000° F. torch directly to the moldings at ambient temperature. The moldings remained substantially unaffected after the application of heat with no visible or physical effect on the interfaced bonds. The zirconia-alumina composite was also hit with a gas torch at about 6000° F. with no apparent damage to the interfacial bond although it melted the alumina.

EXAMPLE 4

Example 1 was repeated using a mold previously immersed in perchloroethylene and the mold filled while still wet. Supercooling occurred quite readily when the composite ceramics were inserted into the freezing liquid and a fine uniform grained composite structure obtained.

EXAMPLE 5

Example 4 was repeated substituting for the NALCO, 50—50 mixture of the sodium stabilized NALCO silica sol and a 30 percent solids lithium stabilized silica sol having a silica:lithia ratio of about 48.

EXAMPLE 6

Example 1 was repeated in which about 0.6 percent by weight a 3.7 percent HCl solution base on the weight of the zirconia was added to the zirconia grains and about 15.6 percent by weight of the Nalco silica sol (30% solids) having a pH of about 10 was used. The amount of acid used is about the same amount that would be required to bring the pH of the sodium stabilized silica sol to about 7-8.

EXAMPLE 7

60 parts by weight of magnesia (50%—14 mesh and 50%—48 mesh) were mixed with 12 parts by weight of a lithium stabilized 30% aqueous silica sol having a silica-lithium ratio of 85, formerly marketed by DuPont under the designation Lithium Polysilicate 85. The mixture was supercooled and frozen in the same manner as set forth in the above examples. No initial reaction was noted and the pot life of the mix was very good.

We claim:

1. A process for making a composite inorganic article which comprises forming a first slurry composed of inorganic particles and a freeze-sensitive colloidal ceramic sol, forming at least a second slurry composed of diffferent inorganic particles having a different mass thermal coefficient of expansion than the inorganic particles contained in the first slurry and a freeze-sensitive colloidal ceramic sol which can be the same as or different from the colloidal sol used in said first slurry, bringing the slurries into physical contact with each other in a layered fashion without substantial intermixing thereof, simultaneously freezing the layered slurries in a cooling media while in contact with each other to form a unified structure that is characterized by an interfacial bond of sufficient strength to withstand temperatures of at least about 3000° F. and having high thermal shock resistance and wherein the difference between the two mass thermal coefficients of expansion, although sufficient to cause disruption of the interfacial bond resulting from conventional processes for producing composite inorganic articles, does not cause disruption of the interfacial bond at temperatures of at least about 3000° F.

2. The process according to claim 1 in which the sol is a silica sol.

3. The process according to claim 1 in which the slurries are supercooled before freezing.

4. The process according to claim 4 in which the cooling media is hydrophobic.

5. The process according to one of claims 1 or 3 in which both of the ceramic sols are lithium stabilized.

6. The process according to one of claims 1 or 5 in which the slurries contain lithium ions in a sufficient amount to inhibit ice crystal growth.

7. A process for making a composite ceramic article which comprises forming a first slurry composed of a ceramic material and a freeze sensitive aqueous colloidal ceramic sol, forming at least a second slurry of a different ceramic material having a different mass thermal coefficient of expansion than the ceramic material contained in the first slurry and a freeze sensitive aqueous colloidal ceramic sol which can be the same as or different from the colloidal ceramic sol used in the first slurry, bringing the slurries into physical contact with each other in a layered fashion without substantial intermixing thereof, simultaneously freezing the layered slurries in a cooling media while in contact with each other to form a unified structure having a strong interfacial bond and firing the unified structure.

8. The process according to claim 7, in which the slurries are supercooled before freezing.

9. The process according to claim 8 in which the sol is a silica sol.

10. The process according to claim 9 in which the cooling media is hydrophobic.

11. The process according to claim 9 in which one of the ceramics is zirconia and in which the sol is a sodium stabilized silica sol and the zeta potential of the particles in the slurry is adjusted to cause association of the ceramic and ceramic sol particles.

12. The process according to claim 12 in which the zeta potential is adjusted by lowering the pH of the slurry below 10 and preferably to about 8.

13. The process according to one of claims 8 or 10 in which the sol is a lithium stabilized silica sol.

14. The process according to one of claims 7, 8, 9 or 10 in which the slurries contain lithium ions in a sufficient amount to inhibit crystal growth.

15. The process according to one of claims 7 or 9 in which one of the ceramics is magnesia and which contains a sufficient amount of lithium ion in the magnesia-ceramic sol mixture to increase the pot life of the magnesia-ceramic sol mixture for a sufficient time to effect freezing of the composite.

16. The process according to claim 1 in which a hydrophobic liquid is interposed between the slurries and the mold surfaces holding the slurries prior to freeze casting of said slurries.

* * * * *